(12) United States Patent
Liu et al.

(10) Patent No.: US 7,801,042 B2
(45) Date of Patent: Sep. 21, 2010

(54) MAXIMUM LIFETIME ROUTING IN WIRELESS AD-HOC NETWORKS

(75) Inventors: Zhen Liu, Tarrytown, NY (US); Arvind Sankar, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/537,590

(22) PCT Filed: Dec. 20, 2002

(86) PCT No.: PCT/US02/40810

§ 371 (c)(1),
(2), (4) Date: Jun. 6, 2005

(87) PCT Pub. No.: WO2004/059928

PCT Pub. Date: Jul. 15, 2004

(65) Prior Publication Data

US 2006/0206857 A1    Sep. 14, 2006

(51) Int. Cl.
*G08C 15/00* (2006.01)
(52) U.S. Cl. .................................... 370/235
(58) Field of Classification Search ............... 370/235, 370/230.1, 231, 236.1, 236.2, 389, 238, 351, 370/237, 412, 429; 455/445; 709/238–244
See application file for complete search history.

(56) References Cited

U.S. PATENT DOCUMENTS

| | | | | |
|---|---|---|---|---|
| 5,426,640 | A * | 6/1995 | Hluchyj et al. ............ | 370/235 |
| 5,777,988 | A * | 7/1998 | Cisneros .................... | 370/238 |
| 5,892,766 | A * | 4/1999 | Wicki et al. ................ | 370/412 |
| 6,115,390 | A | 9/2000 | Chuah | |
| 6,192,029 | B1 | 2/2001 | Averbuch et al. | |
| 6,226,277 | B1 | 5/2001 | Chuah | |
| 6,259,402 | B1 * | 7/2001 | Asai ....................... | 342/357.12 |
| 6,285,665 | B1 | 9/2001 | Chuah | |
| 6,327,254 | B1 | 12/2001 | Chuah | |
| 6,377,544 | B1 * | 4/2002 | Muthukrishnan et al. ... | 370/229 |

(Continued)

FOREIGN PATENT DOCUMENTS

EP    1 122 919    8/2001

(Continued)

*Primary Examiner*—Kwang B Yao
*Assistant Examiner*—Kenan Cehic
(74) *Attorney, Agent, or Firm*—Kenneth R. Corsello; Ryan, Mason & Lewis, LLP (57) ABSTRACT

Routing techniques are provided that meet performance objectives associated with an ad-hoc network environment and the like. The techniques of invention serve to substantially maximize the lifetime of the network. In one aspect of the invention, a packet routing technique for use in a node of a distributed network comprises the following steps/operations. Queues for storing packets are maintained, wherein at least one queue is associated with a link existing between the node and a neighboring node, and a queue has a height associated therewith. A route is then determined for one or more packets stored in the queues based on heights of queues at neighboring nodes, such that energy constraints associated with the node and the neighboring nodes are substantially maximized. As mentioned, the distributed network is preferably a mobile ad-hoc network wherein the node and the at least one neighboring node communicate over a wireless link.

24 Claims, 4 Drawing Sheets

U.S. PATENT DOCUMENTS

| | | |
|---|---|---|
| 6,377,548 B1 | 4/2002 | Chuah |
| 6,400,695 B1 | 6/2002 | Chuah et al. |
| 6,401,147 B1 * | 6/2002 | Sang et al. .................... 710/56 |
| 6,469,991 B1 | 10/2002 | Chuah |
| 6,567,416 B1 | 5/2003 | Chuah |
| 6,594,240 B1 | 7/2003 | Chuah et al. |
| 6,674,765 B1 | 1/2004 | Chuah et al. |
| 6,859,435 B1 * | 2/2005 | Lee et al. .................... 370/231 |
| 7,197,025 B2 * | 3/2007 | Chuah ........................ 370/338 |
| 7,215,641 B1 * | 5/2007 | Bechtolsheim et al. ...... 370/235 |
| 7,254,615 B2 * | 8/2007 | Taib et al. .................... 709/209 |
| 7,313,635 B1 * | 12/2007 | Zavalkovsky ............... 709/248 |
| 2003/0189897 A1 * | 10/2003 | Einstein et al. ............. 370/220 |
| 2004/0032856 A1 * | 2/2004 | Sandstrom ................... 370/351 |
| 2004/0071082 A1 * | 4/2004 | Basu et al. ................... 370/229 |
| 2006/0098692 A1 * | 5/2006 | D'Angelo .................... 370/522 |
| 2006/0215593 A1 * | 9/2006 | Wang et al. .................. 370/315 |
| 2007/0223383 A1 * | 9/2007 | Kamath et al. .............. 370/236 |
| 2008/0132264 A1 * | 6/2008 | Krishnamurthy et al. .... 455/522 |

FOREIGN PATENT DOCUMENTS

WO     WO 01/47181    *   6/2001

* cited by examiner

MAXIMUM LIFETIME ROUTING IN WIRELESS AD-HOC NETWORKS

FIELD OF INVENTION

The present invention relates to wireless ad-hoc networks and, more particularly, to maximum lifetime routing techniques for use in wireless ad-hoc networks.

BACKGROUND OF THE INVENTION

A wireless ad-hoc network, also referred to as a mobile ad-hoc network (MANET), is known to comprise a set of nodes connected by wireless links. Typical examples of ad-hoc networks are wireless sensor networks, where the nodes are sensors that gather environmental data and send the information to computational nodes for further processing, or to base stations for relay to a wired network. Such networks may be deployed, for example, in hazardous locations such as in disaster areas to aid rescue efforts, in areas for mineral or oil prospecting, and in battlefields for defense applications.

The topology of an ad-hoc network is dynamic since nodes are typically free to move randomly and organize themselves arbitrarily. Therefore, the topology may be determined by the current geographic location of the nodes and other environmental conditions, and the characteristics of the radio transceivers that the nodes possess. The topology may therefore be represented as an arbitrary graph with "nodes" of the graph representing nodes in the network and "edges" of the graph representing links between nodes.

The nodes in an ad-hoc network typically attempt to communicate amongst each other by relaying packets. However, due to the limited transmission range that is characteristic of nodes in an ad-hoc network, multiple network "hops" are typically needed for one node to exchange data with another node across the network. The problem is to design effective routing protocols to meet a variety of performance objectives given such a communications environment.

Most existing routing protocols for wireless ad-hoc networks concentrate on finding and maintaining routes in the face of changing topology caused by mobility or other environmental changes. Typical protocols use shortest path methodologies based on hop count, geographic distance, or transmission power. The first two are important in minimizing delay and maximizing throughput. The third objective is peculiar to wireless ad-hoc networks, and is important because typically the nodes involved have a limited power supply, and radio communication consumes a large fraction of this supply.

To address this issue, several power-aware routing and topology control methodologies have been developed. In most of these methodologies, the aim is to minimize the energy consumed per packet in order to deliver it to the destination. The typical approach is to use a distributed shortest path methodology in which the edge costs are related to the power required to transmit a packet between the two nodes involved. The problem with this technique is that nodes on the minitnum-energy path are quickly drained of power, affecting the network connectivity when they fail.

Some of the more sophisticated routing methodologies associate a cost with routing through a node with low power reserves. But this remains, at best, a heuristic solution.

A formulation using linear programming has been proposed which attempts to capture the issue of power consumption more precisely, see J. H. Chang et al., "Routing for Maximum System Lifetime in Wireless Ad-hoc Networks," Proceedings of 37th Annual Allerton Conference on Communication, Control and Computing, September 1999; and J. H. Chang et al., "Energy Conserving Routing in Wireless Ad-hoc Networks" Proceedings of IEEE INFOCOM, pp. 22-31, March 2000, the disclosures of which are incorporated by reference herein. The idea is to make the goal of routing the maximization of the "network lifetime." As is known, the network lifetime is the time period in which the network operates without a node failure. This maximization approach utilizes a heuristic methodology to solve the linear program approximately. However, such a heuristic approach can perform arbitrarily poorly in worst case situations.

Further, a centralized methodology to determine the maximum lifetime has been proposed in J. H. Chang et al., "Fast Approximation Algorithms for Maximum Lifetime Routing in Wireless Ad-hoc Networks," Lecture Notes in Computer Science: Networking 2000, vol. 1815, pp. 702-713, May 2000, the disclosure of which is incorporated by reference herein. Such centralized methodology is based on the Garg-Koenemann methodology for multicommodity flow, as described in N. Garg et al., "Faster and Simpler Algorithm for Multicommodity Flow and Other Fractional Packing Problems, Proceedings of 39th Annual Symposium on Foundations of Computer Science, pp. 300-309, November 1998, the disclosure of which is incorporated by reference herein. However, this approach does not solve all of the performance deficiencies associated with the above linear programming approach.

Accordingly, a need still exists for effective routing techniques that meet performance objectives associated with an ad-hoc network environment and the like.

SUMMARY OF THE INVENTION

The present invention provides effective routing techniques that meet performance objectives associated with an ad-hoc network environment and the like. The techniques of invention serve to substantially maximize the lifetime of the network.

In one aspect of the invention, a packet routing technique for use in a node of a distributed network comprises the following steps/operations. Queues for storing packets are maintained, wherein at least one queue is associated with a link existing between the node and a neighboring node, and a queue has a height associated therewith. A route is then determined for one or more packets stored in the queues based on heights of queues at neighboring nodes, such that energy constraints associated with the node and the neighboring nodes are substantially maximized. As mentioned, the distributed network is preferably a mobile ad-hoc network wherein the node and at least one neighboring node communicate over a wireless link.

One or more packets may be sent, over a link, from a queue of the node to a queue of a neighboring node when the height of the queue of the node is greater than the height of the queue of the neighboring node. Further, one or more packets may be received, over a link, in a queue of the node from a queue of a neighboring node when the height of the queue of the node is less than the height of the queue of the neighboring node.

The node may receive broadcast information from at least one neighboring node pertaining to the height of at least one queue of at least one neighboring node. Further, the node may broadcast information to at least one neighboring node pertaining to the height of at least one queue of the node.

Packets may be routed to and/or from the node in rounds such that throughput requirements are substantially satisfied while substantially maximizing a lifetime associated with the distributed network. Further, the network lifetime has an upper bound and a lower bound associated therewith.

Further, route determination techniques of the invention may also take into account one or more of idle power consumption associated with a node, computation power consumption associated with a node, a periodic recharge associated with a node, one or more edge constraints, and power consumption associated with receiving a packet at a node.

Advantageously, as will be explained in detail herein, the invention may provide a distributed routing methodology that reaches an optimal routing solution to within an asymptotically small relative error. Further, the techniques of the invention are preferably based on the formulation of multicommodity flow, and they take into consideration different power consumption models and bandwidth constraints. While, the inventive techniques may be employed with a variety of networks, they work particularly well for both static and slowly changing dynamic networks. However, the inventive techniques may also be implemented in accordance with a dynamic network.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS OF THE INVENTION

The following description will illustrate the invention using an exemplary ad-hoc network architecture. It should be understood, however, that the invention is not limited to use with any particular ad-hoc network architecture. Rather, the invention is more generally applicable to any network architecture in which it is desirable to perform effective data routing.

Figure 1:
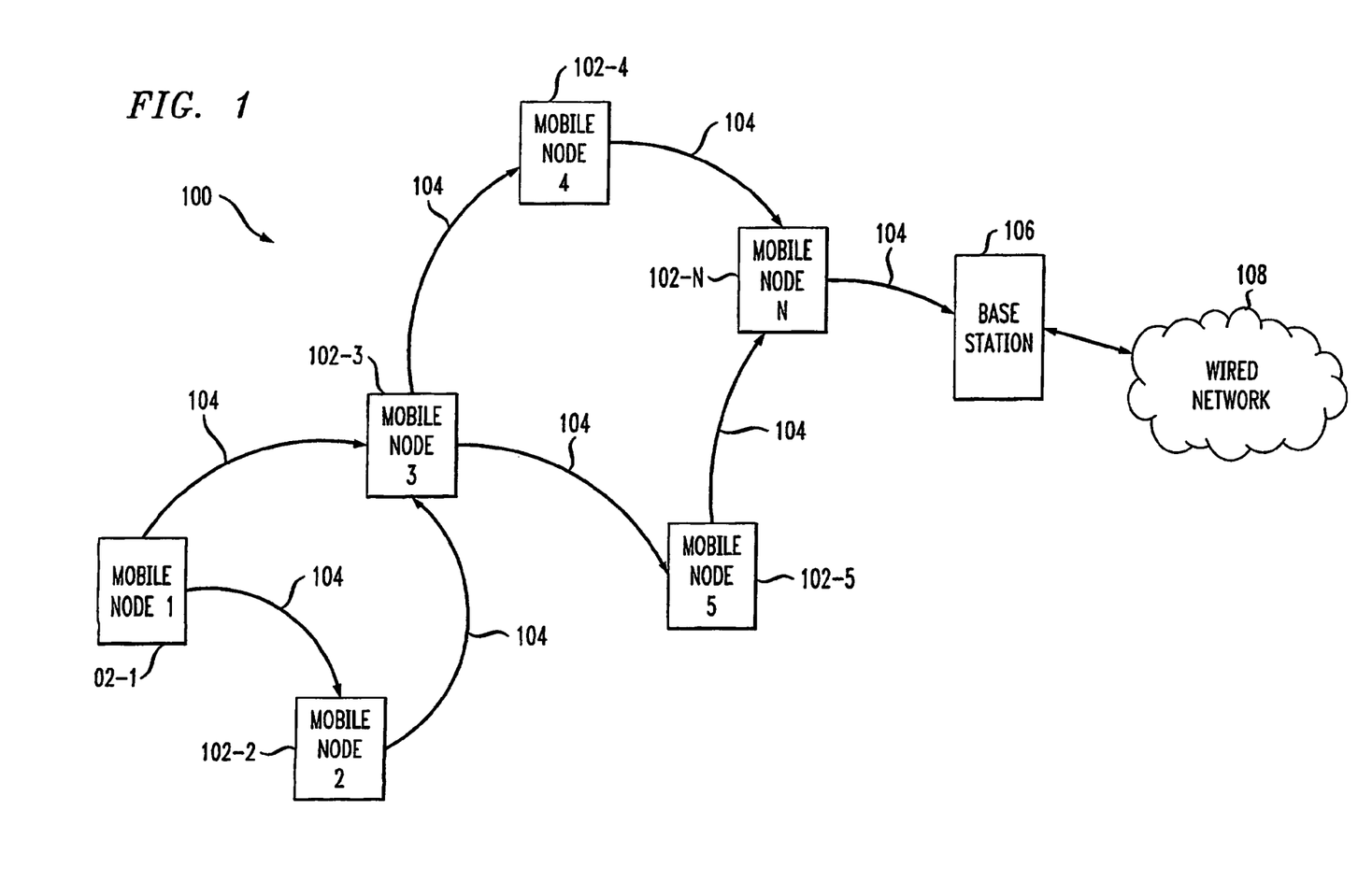
FIG. 1 is a block diagram illustrating a wireless ad-hoc network in which the techniques of the present invention may be implemented.

Referring initially to FIG. 1, a block diagram illustrates a wireless ad-hoc network in which the techniques of the present invention may be implemented. As shown, a wireless ad-hoc network 100 comprises a plurality of mobile nodes 102-1 through 102-N connected by wireless links. The number of nodes N depends on the application in which they are to be deployed and, thus, the invention is not limited to any particular number.

Nodes 102-1 through 102-N are free to move randomly and organize themselves arbitrarily. Thus, the topology of the ad-hoc network 100 is dynamic. Further, nodes 102-1 through 102-N communicate amongst each other by relaying packets. However, as mentioned above, due to the limited transmission range that is characteristic of such nodes in an ad-hoc network, multiple network hops (denoted as 104 in FIG. 1) may be needed for one node to exchange data with another node across the network 100.

Thus, as shown in FIG. 1, node 102-1 may communicate with node 102-N by transferring packets via a wireless link to node 102-3 (first hop), which then transfers the packets via a wireless link to node 102-4 (second hop), which then transfers the packets via a wireless link to node 102-N (third hop). Of course, depending on various factors, packets may be transferred from node 102-1 to 102-N via other routes with more or less hops 104. It is also to be understood that, for the sake of clarity, FIG. 1 does not expressly illustrate all possible hop arrangements that may be utilized to transfer packets from one node to another. Also, it is to be appreciated that a node may have separate wireless links between itself and other nodes, however, a hop refers to the transfer of data from the node to one of the other nodes via one of its wireless links. In any case, it is to be appreciated that it is the selection of a route (i.e., determining a routing solution) in the network upon which the invention primarily focuses.

It is to be appreciated that any one of the nodes in the network 100 may serve as a computational node, wherein the packets transferred thereto may be further processed in some manner. In addition, node 102-N, or any other receiving node within range of a base station 106 in the network, may transfer information to the base station for relay to a wired network 108. The wired network 108 may be a private data network, the Internet, etc. It is to be understood that, for the sake of clarity, only one base station and wired network is illustrated in FIG. 1; however, there may be one or more additional base stations communicating with one or more additional wired networks. Of course, it is also to be understood that network 108 could alternatively be another wireless network.

Thus, in the case where the nodes 102-1 through 102-N are deployed in a hazardous or hostile environment in order to collect data in the environment, the data collected by the nodes may be transferred to a remote location, via the wired network 108, such that it can be presented and/or analyzed in a non-hazardous or non-hostile (or, at least, less hazardous or hostile) environment.

Figure 2:
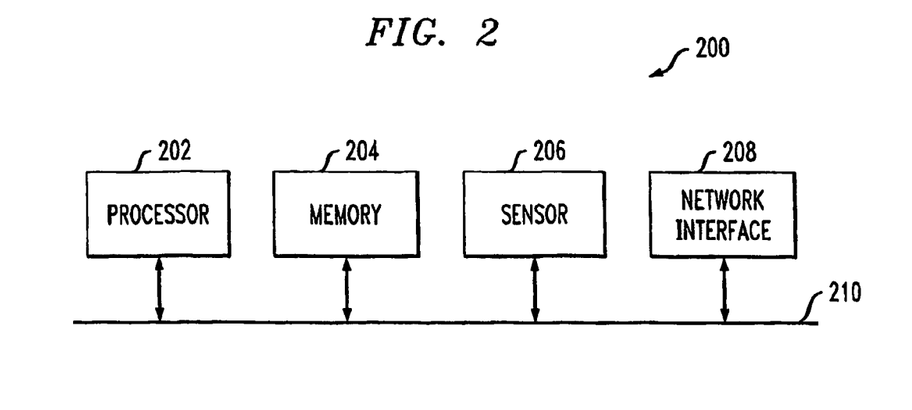
FIG. 2 is a block diagram illustrating an example of a computing system which may be employed to implement the techniques of the present invention.

Referring now to FIG. 2, a block diagram illustrates an example of a computing system or device which may be employed to implement all or a portion of the techniques of the present invention. More particularly, one or more of nodes 102-1 through 102-N and/or base station 106 may implement such a computing system 200 to perform the techniques of the invention (although, a base station may not necessarily require a "sensor," as will be explained below). Of course, it is to be understood that the invention is not limited to any particular computing system implementation.

In this illustrative implementation, a processor 202 for implementing at least a portion of the methodologies of the invention is operatively coupled to a memory 204, a sensor 206 and a network interface 208 via a bus 210, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. The memory may preferably be used to implement the one or more queues associated with a node, to be discussed below.

Further, the term "sensor" as used herein is intended to include, for example, one or more devices capable of collecting data from the environment in which the computing system 200 (e.g., mobile node) is deployed. Examples of sensors may be receivers associated with wireless communication devices, which are capable of collecting data from the environment in which they are deployed. However, it is to be understood that the invention is not limited to any particular sensor. Also, a base station will typically not have a sensor.

Still further, the phrase "network interface" as used herein is intended to include, for example, one or more devices capable of allowing the computing system 200 (e.g., mobile node or base station) to communicate with another computing system (e.g., mobile node or base station). Thus, the network interface may comprise a transceiver configured to communicate with a transceiver of another computing system (e.g., mobile node or base station) via a suitable wireless protocol. Examples of wireless transmission protocols may be Bluetooth and IEEE 801.11. However, it is to be understood that the invention is not limited to any particular communications protocol.

It is to be appreciated that while the present invention has been described herein in the context of a network communications system, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 202.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

For ease of reference, the remainder of the detailed description is divided into the following sections: (1) Introduction; (2) Problem Formulation; (3) Local-Control Flow Methodology; (4) Maximizing Lifetime; (5) Implementation; (6) Extension to Local Constraints; and (7) Illustrative Decision Flow at Node.

1. Introduction

As mentioned above, given the characteristics of an ad-hoc network environment, a problem is to design effective routing methodologies to meet a variety of performance objectives of the ad-hoc network environment. The invention addresses this problem and provides solutions for realizing such performance objectives.

In accordance with the invention, as illustrated hereinbelow, the routing problem is explicitly formulated as a maximum concurrent flow problem. All routing problems have analogous flow realizations, where the flow represents the routes that packets take, and the demands represent the rate at which packets are generated by various nodes. This formulation allows for the application of maxflow techniques to the problem of routing for maximum network lifetime. However, many of the known maxflow techniques are not well-suited to distributed implementation as is necessary for a routing methodology, or do not adapt well to changing network topology. Moreover, they are typically better-suited to the problem of wired network routing where the constraints are link bandwidth (the number of packets that can be routed over an edge in unit time) and node capacity (the number of packets that can be forwarded by a node in unit time).

The present invention provides a distributed flow methodology to the routing problem. The methodology finds an approximation to a feasible flow if one exists. Advantageously, unlike existing heuristic approaches (e.g., heuristic approaches described above in the background section), the approximation factor of the invention is guaranteed. Also, in accordance with the invention, lower bounds are established for the performance of the methodology. While the techniques of the invention are applicable to a wide variety of networks, the techniques are particularly well-suited to static networks with various power consumption models, as well as dynamic networks with slowly changing edge costs.

One example of an advantage that the inventive approach has over existing routing approaches is that the invention is a distributed, local-control approach and therefore does not require a central node with global knowledge of the network. This is also one reason why the inventive approach works well with dynamic networks.

2. Problem Formulation

In this section, the problem is formulated more precisely, and both a linear programming and a flow interpretation are provided.

The subject network in which the inventive routing methodology is to be implemented (such as, for example, network 100 in FIG. 1) is represented as a graph, with N nodes and M edges, with the nodes representing wireless devices and the edges the wireless links between them. Associated with each node i is a quantity $E_i$, representing the initial energy reserve of the device. Each edge ij has a cost $e_{ij}$, which is the energy required to transmit one packet of data across the corresponding link.

The routing problem comprises of a set of K source and destination pairs, which are pairs of nodes in the network. Each pair has a throughput requirement $Q_c$, the number of packets per second that must be routed between source and destination nodes. The routes are given by variables $f_{ij}^c$, which represent the rate at which packets are transmitted across link ij for connection c.

2.1 Linear Programming Formulation

The "lifetime" of the network is defined as the time period before which the first node failure occurs, that is, the time period before which some node's energy reserve is reduced to zero. The invention routes packets in such a manner that the lifetime is maximized while the throughput requirements are satisfied. The lifetime is denoted by T. Variables $f_{ij}^c$ denote the total number of packets for connection c transmitted from node i to node j over the lifetime of the network.

The total energy consumed at node i is given by:

$$\sum_{j,c} e_{ij} \hat{f}_{ij}^c$$

where the sum is over all nodes adjacent to i and all connections c. At every node except the source and destination for a particular connection c, the number of packets received equals the number of packets transmitted. At the source, the number of packets transmitted equals $Q_cT$ over the lifetime T of the network.

Hence, the linear program is:

maximize $T$ such that: (1) $\hat{f}_{ij}^c \geq 0$  $\forall i, j, c$ (2) $\sum_{j,c} e_{ij} \hat{f}_{ij}^c \leq$  $\forall i$ (3) $\sum_j \hat{f}_{ij}^c - \sum_k \hat{f}_{ki}^c = \begin{cases} Q_cT & \forall i, c \\ 0 \end{cases}$ i is a source for c otherwise.

The second constraint is due to the finite power supplies at the nodes, and the third represents the throughput requirements at the sources and the conservation constraints at other nodes.

This formulation serves to show that the problem can theoretically be solved exactly in polynomial time.

2.2 Multicommodity Flow

The routing problem can generally be interpreted as a flow problem. The variables $f_{ij}^c$ can be thought of as flow values of a commodity c. The requirement that incoming packets arrive at the same rate as outgoing packets leave is equivalent to the flow conservation constraint that, at any intermediate node, the amount of incoming flow equals the amount of outgoing flow. The sources and destinations of the routing problem become sources and sinks in the flow problem. The throughput requirements $Q_c$ represent the rate at which flow is produced at the sources and consumed at the sinks. So at each instant of time, the routing is represented as a multicommodity flow satisfying demands $Q_c$.

The time evolution of the network is considered as proceeding in a sequence of synchronous rounds, each lasting for unit time. In each round, $Q_c$ packets are generated at each source node. Packets may be transmitted between nodes, and the energy reserve of each node is reduced by the total cost of the packets it transmits. So, if $f_{ij}$ is the number of packets transmitted by node i to node j, the energy reserve of i is reduced by $\sum_j e_{ij} f_{ij}$ in this round. Since each node will actually be forwarding packets for a number of connections, the reduction in the energy is given by:

$$\sum_{j,c} e_{ij} f_{ij}^c$$

From the problem formulation, it might appear that a more general version is to ask for how many rounds a feasible multicommodity flow can be maintained, where the flow is allowed to vary with time, and some intermediate nodes might fail before the demands become infeasible. This does not lead to an improvement in the lifetime achievable over a static flow that lasts only until the first node failure, however, as can be seen by the following argument: suppose the flow achieving the maximum lifetime T is $f_{ij}^c(t)$ at time t, and satisfies the demands at every instant. Replace this variable flow by its time average:

$$\hat{f}_{ij}^c = \frac{1}{T} \int_0^T f_{ij}^c(t) dt$$

This static flow will satisfy the same demands at every instant, and now no node will fail before the lifetime T. Since the flow is static, the energy consumed in any round at a node i cannot exceed $E_i/T$.

Thus, it is enough to look for a multiflow satisfying all the demands, and constrained by:

$$\sum_{j,c} e_{ij} f_{ij}^c \leq \frac{E_i}{T} \text{ for all } i$$

to achieve a lifetime of T. An approximation methodology for this problem will be described in the next section.

3. Local-Control Flow Methodology

The methodology of the invention will be expressed in terms of the above-described flow interpretation. A goal is to determine whether a given value of the lifetime T is feasible. That is, is it possible to route flow in the network so that all the demands are satisfied, and no node runs out of energy before T rounds have gone by.

It is assumed that there exists a multiflow that satisfies not just the demands $Q_c$, but slightly more, namely, the demands $(1+\epsilon)Q_c$, for some parameter $\epsilon > 0$.

Thus, the present invention provides the following principle (1):

If the demands $(1+\epsilon)Q_c$ are feasible, then there exists a routing methodology that satisfies the demands $(1-\delta)Q_c$, for any $\delta > 0$, after running for $$\frac{8ML(K + 1n(6K/\epsilon))}{\epsilon \delta}$$

rounds.

Principle (1) will be proven below by actually describing such a methodology and giving a complete analysis of its performance. It is to be understood that in accordance with the inventive approach, the constraints are on the nodes, since each node must respect its energy budget $E_i/T$.

3.1 Description

Each node maintains K queues for each of its links. In each round, the flow in a queue may be moved to the other end of the link. Flow may also be redistributed among the queues at a single node.

Denote by $q_{ij}^c$ the height of the queue for commodity c on link ij at node i. The link has another queue at its other end, denoted by $q_{ji}^c$.

A potential function $\phi(q)$ associated with every queue is defined, where q is the queue height. The potential function will be completely specified when the performance of the methodology is analyzed below, for now note that it is a twice-differentiable convex function. The methodology operates so as to minimize the sum of the potential functions of all queues.

Figure 3:
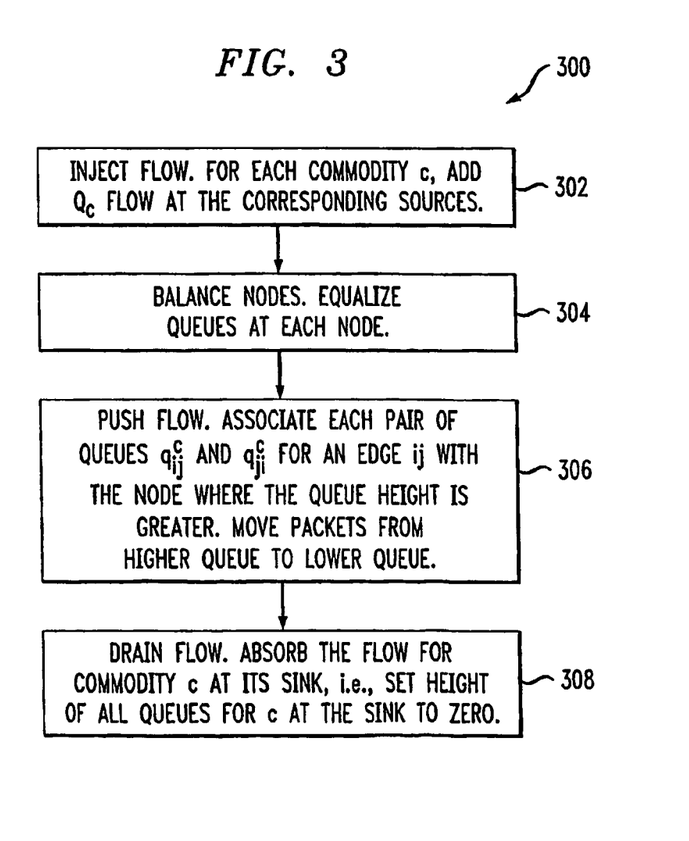
FIG. 3 is a flow diagram illustrating a core routing methodology according to an embodiment of the present invention.

Referring now to FIG. 3, a flow diagram illustrates a routing methodology (referred to herein as the "core" methodology) according to an embodiment of the invention. In each round of the methodology 300, the following phases (steps) are performed:

- Inject flow (step 302). For each commodity c, add $Q_c$ flow at the corresponding sources.
- Balance nodes (step 304). Equalize the queues at each node.
- Push flow (step 306). Associate each pair of queues $q_{ij}^c$ and $q_{ji}^c$ for an edge ij with the node where the queue height is greater. To reduce the potential, packets are moved from the higher queue to the lower (this follows from the convexity of $\phi$). So, the following function is minimized:

$$\sum_{j,c} \phi(q_{ij}^c - f_{ij}^c) + \phi(q_{ji}^c + f_{ij}^c)$$

where the sum is over edges ij associated with node i, and the variables are the $f_{ij}^c$ subject to the constraint:

$$\sum_{j,c} e_{ij} f_{ij}^c \leq \frac{E_i}{T}$$

The solution $f_{ij}^c$ is then used to move flow from node i to node j.

- Drain flow (step 308). Absorb the flow for commodity c at its sink. That is, set the height of all queues for c that are at the sink to zero.

3.2 Analysis

It will be shown that the potential in the system remains bounded as time goes on, which implies that most of the flow injected into the network reaches the appropriate sink.

The idea is to lower-bound the decrease in potential in a round by comparing what the methodology does to what would happen if the flow values were picked according to a feasible multiflow instead. This will in turn imply an upper bound on how large the potential can become as the methodology is repeatedly executed.

For simplicity in writing the expressions, it will be assumed that the source nodes and the destination nodes both have unit degree, and that all flows and queues are scaled so that the demand for each commodity is unity.

The increase in potential after the first two phases will be at most:

$$\sum_c \phi(s_c) - \phi(s_c - 1) \leq \sum_c \phi'(s_c).$$

where $s_c$ is the total amount of commodity c at the source after flow injection.

The potential decreases when flow is pushed, and to estimate the decrease in potential, it is considered what happens if a feasible flow $f_e^c$ satisfying the demands $(1+\epsilon)$ is used, instead of the computed minimizing flow values. The expression is:

$$\sum_{e,c} \phi(q_{eh}^c) + \phi(q_{et}^c) - \phi(q_{eh}^c + f_e^c) - \phi(q_{et}^c - f_e^c)$$

where the summation extends over all edges in the network, and $q_{eh}^c$ and $q_{et}^c$ denote the queue heights for commodity c at the head and tail of the edge, respectively. The extended mean value theorem is applied to $\phi$ and the expression simplified to:

$$\sum_{e,c} f_e^c (\phi'(q_{et}^c) - \phi'(q_{eh}^c)) - \frac{1}{2}(f_e^c)^2(\phi''(q_{eh}^c + \zeta_{eh} f_e^c) + \phi''(q_{et}^c f_e^c))$$

where the $\zeta_{et}$ and $\xi_{eh}$ are suitable constants between 0 and 1. Note now that the first derivative terms will cancel out except at the source and sink, because in the node balancing phase, all the queue heights for a given commodity at a given node are made equal, and $f_e^c$ satisfies the flow conservation property. The potential function is chosen so that the second derivative terms make a very small contribution to the sum. In particular, assume that their contribution is at most $\epsilon/2\phi'(s_c)$. Hence, the potential drop is at least:

$$\sum_c (1+\epsilon)\left(\left(1 - \frac{\epsilon}{2}\right)\phi'(s_c) - \phi'(0)\right)$$

So, overall during the round, the potential drops by at least:

$$\sum_c \left(\frac{\epsilon}{2} - \frac{\epsilon^2}{2}\right)\phi'(s_c) - (1+\epsilon)K\phi'(0)$$

Note that if the flow values $f_e^c$ that move flow from a lower height queue to a higher queue are ignored, only the potential drop will be improved. Since, the inventive methodology considers all such feasible updates while minimizing, the potential drop it finds will be better than the one just derived.

Let S be the value that satisfies the equation:

$$\left(\frac{\epsilon}{2} - \frac{\epsilon^2}{2}\right)\phi'(S) = (1+\epsilon)K\phi'(0)$$

So, if $s_c \geq S$ for any commodity, then the potential drop during the round will be non-negative. The amount of commodity c in the network is bound by 2MS by showing that no queue can exceed S in height.

To accomplish this, overflow buffers are used at each source node. The idea is that if the queue at the source has reached S, then additional injected flow is put in a special overflow buffer, which has potential $b\phi'(S)$ if it has b amount of commodity. With this potential function, the increase in potential when flow is injected remains upper-bounded by $\phi'(s_c)$. The advantage of bounding the source queue is that no other queue can exceed this bound. It is thus easy to see that, given a particular value of queue height, S in this case, the first queue to exceed this height must be at the source.

Now we argue by induction on the number of rounds that the potential must always be less than $2MK\phi(S)$. For as long as the overflow buffers are empty for all commodities, this remains true. If, on the other hand, the flow injection phase overflows some source queues, then the potential actually drops during this round.

Hence, the maximum size of an overflow buffer is $2MK\phi(S)/\phi'(S)$. This result will be needed in the next section, so it is restated as principle (2):

If S satisfies the equation $$\left(\frac{\epsilon}{2} - \frac{\epsilon^2}{2}\right)\phi'(S) = (1+\epsilon)K\varphi'(0)$$

then the maximum size of an overflow buffer is $2MK\phi(S)/\phi'(S)$.

The maximum amount of commodity c within the edge queues is 2MS, hence, combining this with the upper bound on the overflow buffers, we get an upper bound of $2M(S+K\phi)(S)/\phi'(S))$ on the total amount of commodity in the system.

Now we set the potential function $\phi(q) = e^{aq}$, for $a = \epsilon/4L$, where L is an upper bound on the length of the longest flow path in the feasible flow $f_e^c$. This gives, for $\epsilon$ small enough:

$$\sum_e \frac{1}{2}(f_e^c)^2(\phi''(q_{eh}^c + \zeta_{eh}^c f_e^c) + \phi''(q_{et}^c - \zeta_{et}^c f_e^c)) \leq$$

$$\sum_e (f_e^c)^2 a^2 e^{a(S+f_e^c)} \leq (1+\epsilon)ae^{a(1+\epsilon)}\sum_e f_e^c \phi'(S) \leq$$

$$(1+\epsilon)\frac{\epsilon}{4L}e^{\epsilon(1+\epsilon)/4L}L(1+\epsilon)\phi'(S) \leq \frac{\epsilon}{2}\phi'(S)$$

The equation for S gives $$S \leq \left(\frac{4L\ln(6K/\epsilon)}{\epsilon}\right).$$

So, the total amount of a given commodity in the system is at most $R = 8ML(K+\ln(6K/\epsilon))/\epsilon$.

Suppose that the methodology is run continuously for $R/\delta$ rounds. The amount of commodity c pumped into the network is $R/\delta$, and the amount remaining in the network is at most R. Hence, the average amount of commodity transported through the network per round is $1-\delta$. This proves principle (1) above.

Another parameter of interest is the average delay a packet experiences while being routed by the inventive methodology. Since the amount of commodity in the system is bounded by R in the long run, the average delay is also upper-bounded by R, by Little's Law.

Thus, principle (3) may be stated as:

$$\text{The average delay of a packet is at most } \frac{8ML(K+\ln(6K/\epsilon))}{\epsilon}.$$

4. Maximizing Lifetime

Now a description is provided on how to use the methodology to converge to the routing appropriate to the maximum lifetime. Consider temporarily that centralized control is available, and information can be updated at all the nodes at the same time.

The node constraints will be set to $E_i/T$, and we will vary T until it converges to the optimal value $T^*$. The idea is that if T is too large, then the node constraints are too tight to allow for a feasible flow, hence the source queues will grow without bound. Hence, we start out T at some value that is smaller than the true lifetime and increase it until we find that some overflow buffer exceeds the bound $2MK\phi(S)/\phi'(S)$. Now, we know the optimal lifetime $T^*$ to within a factor of two, and can perform a bisection search to determine it exactly.

Suppose it is desired to determine the optimum lifetime $T^*$ to within a relative error of $\epsilon$. Initialize T to some suitable value $T_0$, which is assumed to be less than the optimum $T^*$. Let the methodology run for 2 R rounds. If no overflow buffer exceeds the bound $2MK\phi(S)/\phi'(S)$, then it is known that the average fraction of commodity transported through the network is at least one-half by principle (1).

Notice that if demands $\lambda Q_c$ can be satisfied with constraints $E_i/T$, then scaling all the flow values by $1/\lambda$ shows that demands $Q_c$ can be satisfied with constraints $E_i/\lambda T$. Hence, if demands $Q_c/2$ are being satisfied on average with constraints $E_i/T$, then it is known that demands $Q_c$ can be satisfied with constraints $2E_i/T$, and so $T^* \geq T/2$. T is doubled and run for another 2 R rounds. This process is repeated until some overflow buffer bumps up against the $2MK\phi(S)/\phi'(S)$ upper bound, say when $T = T_1$. At this point, it is known that:

$$(1+\epsilon)T_1 \geq T^* \geq \frac{T_1}{4}$$

The upper bound is because if demands $(1+\epsilon)Q_c$ had been feasible with constraints $E_i/T_1$, then by principle (2), the overflow buffers cannot exceed $2MK\phi(S)/\phi'(S)$.

The methodology is stopped as soon as an overflow buffer hits its bound, even if the full 2 R rounds have not been executed. Because of this, the maximum overshoot that can happen in an individual buffer is one unit, corresponding to a potential overshoot of $\phi'(S)$. To get the potential back under the bound $2MK\phi(S)$, a round of the methodology is run without injecting any new packets at the sources that overshot. Suppose that K' of the source overflow buffers exceed their bounds. Then, the decrease in potential that this round produces will be at least $K'\phi'(S)$, and hence will be sufficient to reduce the potential below $2MK\phi(S)$.

The power consumed at node i during this process of finding an upper bound on $T^*$ is at most:

$$2E_i R\left(\frac{1}{T_0} + \frac{1}{2T_0} + \cdots\right) \leq \frac{4E_i R}{T_0}$$

Now that upper and lower bounds are obtained, a search is performed to determine the value of T* more accurately. The first approach is to use a bisection search, running the methodology for R/ϵ rounds to cut the search interval approximately in half. But a second technique cuts the search time significantly. If $T_h$ and $T_l$ are the current upper and lower bounds (initially $T_h=T_1$ and $T_l=T_1/4$), a test value $T=(2T_h+T_l)/3$ is chosen, a third of the way from $T_h$ to $T_l$, and the methodology is run for R/δ rounds, where $δ=(T_h-T_l)/3T$. The idea is that if no source overflow buffer exceeds its bound within these many rounds, then by principle (1):

$$(1 + \epsilon)T_h \geq T^* \geq T(1-\delta) = \frac{T_h + 2T_l}{3}$$

and if some buffer does exceed its bound, then:

$$(1+\epsilon)T \geq T^* \geq T_l$$

In either case, the search interval is reduced by a factor of ⅔. The excess power consumed at node i (over the ideal $E_i/T^*$) during these R/δ rounds is at most:

$$\frac{R}{\delta}\left(\frac{E_i}{T} - \frac{E_i}{T^*}\right) \leq \frac{3E_i R}{T^*}$$

The number of rounds spent during this search process is at most:

$$R \sum_{i=1}^{\lfloor \log_{2/3} \epsilon/3 \rfloor} \left(4 \cdot \left(\frac{3}{2}\right)^{i-1} + 1\right) \leq \frac{25R}{\epsilon}$$

and the total excess power consumption at node i is at most:

$$\frac{3E_i R \log_{3/2}(3/\epsilon)}{T^*}$$

The total number of rounds spent to converge to an accurate value of T* is hence:

$$R\left(2\log\frac{4T^*}{T_0} + \frac{25}{\epsilon}\right)$$

During the remaining rounds, the power consumed per round is at most $E_i/(1-\epsilon)T^*$. Hence, if:

$$\frac{4E_i R}{T_0} + \frac{3E_i R \log_{3/2}(3/\epsilon)}{T^*} \leq \epsilon E_i$$

then the node will last for at least (1−2ϵ)T* rounds. Hence, if $T_0=8R/\epsilon$ is chosen, and if:

$$T^* \geq \frac{6R\log_{3/2}(3/\epsilon)}{\epsilon}$$

then the remaining life of the node is at least (1−2ϵ)T*.

Further, a principle (4) may be stated:

There exists a routing protocol that achieves a lifetime of (1−2ϵ)T*, if $$T^* \geq \frac{48ML\log_{3/2}(3/\epsilon)(K + ln(6K/\epsilon))}{\epsilon^2}.$$

For a given value of T*:

$$\epsilon = \Theta\left(\frac{ML}{T^*}\left(K + \log\frac{T^*}{ML}\right)\right)^{\frac{1}{2}}$$

should be chosen to get the best possible bound. It is to be understood that f=Θ(g) means that there exist constants $c_1$ and $c_2$ such that $c_1 g \leq f \leq c_2 g$.

5. Implementation

In this section, three issues associated with implementing the methodology as presented so far are considered. The first issue is that, thus far, the flow has been treated as a continuous quantity. However, in routing, it is typically not desirable to split up packets. Thus, the queues are discretized so that they contain an integral number of packets, and an entire packet is routed at a time. The second issue is computing the flow values that minimize the potential function at a node. The third issue is how to converge to the maximum lifetime in a distributed manner rather than in the centralized fashion analyzed above.

Another problem that occurs in practice is that traffic does not arrive in a smooth, deterministic manner, but may be intermittent or bursty in nature. To deal with this, a "leaky bucket" is added at every source to smooth out the traffic.

5.1 Discretizing Flow

The node rebalancing phase of the methodology is modified to rebalance the queues while maintaining an integer number of packets in each queue. This implies that the actual height of a queue might differ by up to one packet from its ideal height.

This introduces an error term into the analysis of the methodology. While deriving the drop in potential by routing a flow $f_e^c$ across an edge e, the following expression is obtained:

$$\sum_{e \cdot c} f_e^c (\phi'(q_{et}^c) - \phi'(q_{eh}^c)) + \text{second derivative terms}$$

The first term might differ from its ideal value (when the q's are allowed to vary continuously) by:

$$\sum_{e,c} \frac{f_e^c}{Q_c}(\phi''(q_{et}^c + \eta_{et}^c/Q_c) + \phi''(q_{eh}^c + \eta_{eh}^c/Q_c))$$

where $n_{et}^c$ and $n_{eh}^c$ are between $n_{eh}^c$ are between −1 and 1. This sum is at most:

$$\sum_{e,c} \frac{f_e^c}{Q_c} (2a^2 e^{aS}) \leq 2(1+\epsilon) L \frac{\epsilon}{4L} \phi'(S) \leq \epsilon \phi'(S)$$

So, this does not significantly affect the analysis of the methodology.

5.2 Minimizing Potential

The problem to solve at each node is:

$$\text{Minimize} \sum_{j,c} \phi(q_{ij}^c - f_{ij}^c) + \phi(q_{ji}^c + f_{ij}^c)$$

$$\text{subject to} \sum_{j,c} e_{ij} f_{ij}^c \leq \frac{E_i}{T}$$

Using the technique of Lagrange multipliers, the $f_{ij}^c$ satisfy the system:

$$\phi'(q_{ij}^c - f_{ij}^c) - \phi'(q_{ji}^c - f_{ij}^c) = \lambda e_{ij}$$

So, the maximum of the quantities is computed:

$$\frac{\phi'(q_{ij}^c) - \phi'(q_{ji}^c)}{e_{ij}}$$

(which must be equal when the minimum potential solution is reached) over the edges ij and connections c and route one packet for that edge and connection. The queue heights are updated and the process repeated until the energy budget $E_i/T$ is exhausted.

5.3 Distributed Implementation

The core of the methodology (described above in section 3) may be implemented in a distributed manner in a straightforward manner. A more difficult task is defining a distributed protocol for doing the work of maximizing the lifetime (described above in section 4). Such a distributed protocol is described below.

The idea is that each source sends out a broadcast (forwarded to each neighbor along with data packets) whenever its overflow buffer hits the bound $2MK\phi(S)/\phi'(S)$. Each node receives the broadcast in at most N rounds.

In the initial phase, every 2 R rounds, every node doubles its local value of T. If during the next N rounds, it receives a broadcast message from a source, it switches into the next phase, and forwards the broadcast.

In the second phase, each node maintains the upper and lower bounds $T_h$ and $T_l$, and computes the test value $T=(2T_h+T_l)/3$ to determine its local energy budget. If after $R/\delta+N$ rounds, no source broadcast is received, the value of $T_l$ is updated to $(T_h+2T_l)/3$. If a broadcast is received, the value of $T_h$ is updated to T. This continues until the value of T* is determined (to within relative error $\epsilon$).

Figure 4:
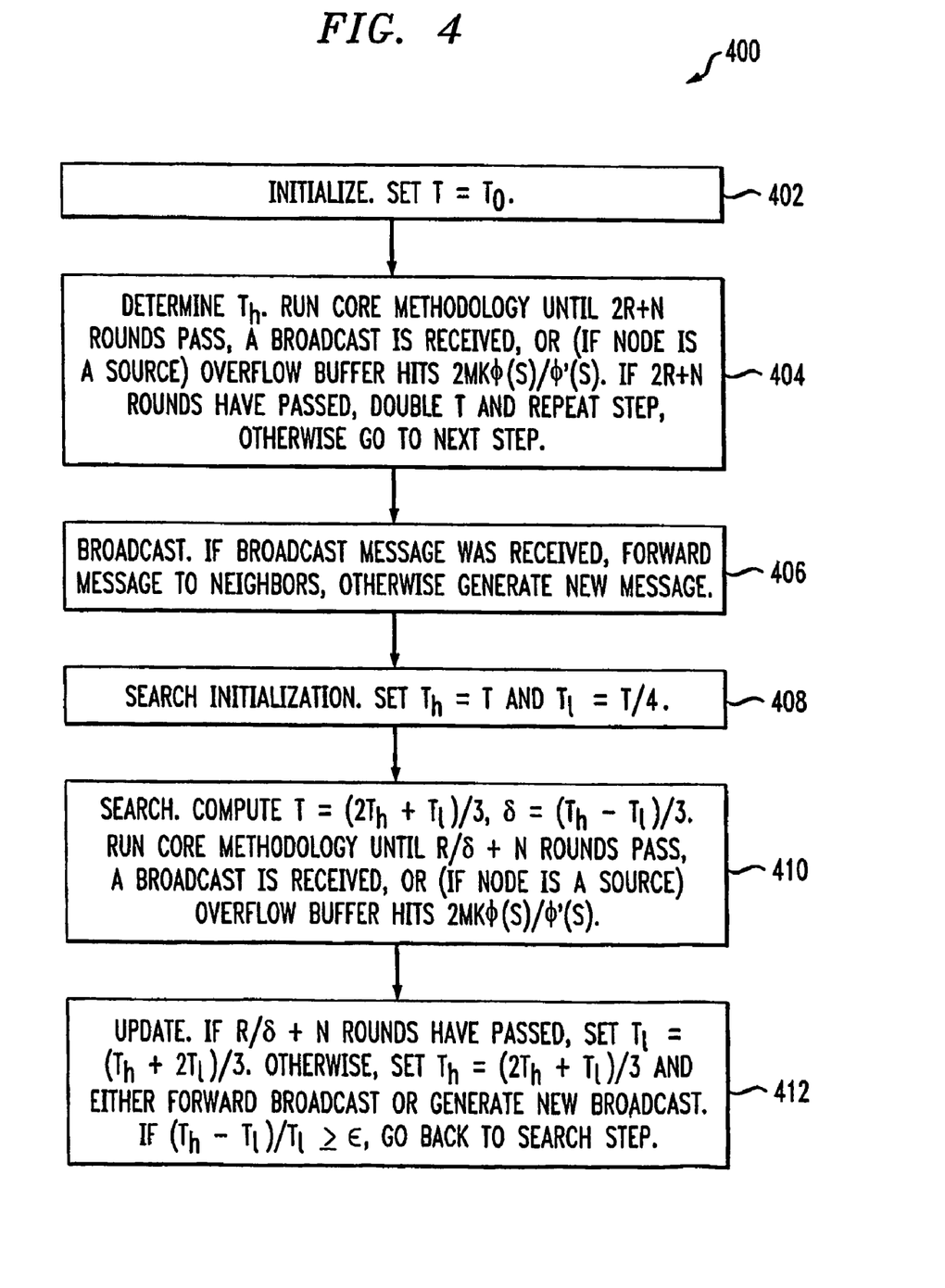
FIG. 4 is a flow diagram illustrating a distributed routing methodology according to an embodiment of the present invention.

Referring now to FIG. 4, a flow diagram illustrates a routing methodology (referred to herein as the distributed routing methodology) according to an embodiment of the invention. The methodology 400 executed at each node can be summarized as follows:

Initialize (step 402). Set $T=T_0$.

Determine upper bound $T_h$ (step 404). Run core methodology until 2 R+N rounds pass, a broadcast is received, or (if the node is a source) the overflow buffer hits $2MK\phi(S)/\phi'(S)$. If 2 R+N rounds have gone by, double T and repeat this step, otherwise move to the next one.

Broadcast (step 406). If a broadcast message was received, forward it to neighbors, else generate a new one.

Search initialization (step 408). Set $T_h=T$ and $T_l=T/4$.

Search (step 410). Compute $T=(2T_h+T_l)/3, \delta=(T_h-T_l)/3$. Run the core methodology until $R/\delta+N$ rounds pass, a broadcast is received, or (if the node is a source) the overflow buffer hits $2MK\phi(S)/\phi'(S)$.

Update (step 412). If $R/\delta+N$ rounds have passed, set $T_l=(T_h+2T_l)/3$. Otherwise, set $T_h=(2T_h+T_l)/3$ and either forward the broadcast or generate a new one. If $(T_h-T_l)/T_l \geq \epsilon$, go back to the Search step.

The analysis of this distributed protocol is similar to the centralized one and leads to the same bounds except for a small constant factor, since N is small compared to R.

5.4 Arbitrary Traffic Sources

In practice, traffic may not arrive in the smooth, deterministic manner we have assumed so far, but may be intermittent or bursty in nature. To deal with this, we add a leaky bucket at every source to smooth out the traffic. A leaky bucket is a controller used in network applications to smooth out traffic flow. The idea is that $\rho$ tokens are generated per second, and tokens are dropped if there are more than $\sigma$ of them. Each packet transmission consumes one token. If tokens are not available, the packets are buffered until they become available. Such a controller limits the traffic transmitted: the number of packets transmitted in a time interval T can never exceed $\rho T+\sigma$. In the present application, the special case where $\sigma$ is zero is employed, so that the traffic is smoothed out completely.

5.5 Acceleration of the Methodology

It is realized that a delay can grow unexpectedly fast. On a route of length L, the delay a packet faces may grow as $L^2$ because the queues decrease linearly from source to sink (after convergence to the appropriate flow). To both reduce this delay and to accelerate convergence, the methodology may be modified in the following manner. The flow to be sent on an edge may be modified by using some history, that is, the actual flow is computed as a linear combination of the flow that the original methodology (or the first-order method) chose, and the flow that was sent on the edge in the previous step. For a suitable choice of the coefficients of the two components, the convergence can be accelerated in this new second-order method. If the coefficient of the flow in the previous step is close to 1, then the final queue heights will be smaller than in the first-order method, thus reducing delay.

The actual flow in the second-order method is thus calculated as:

$$f = \alpha f_0 + \beta f'$$

where $f_0$ is the flow given by the first-order method, $f'$ is the flow sent in the previous step, and $\alpha$ and $\beta$ are suitable parameters. The convergence can be significantly accelerated when $\alpha+\beta>1$. The closer $\beta$ is to 1 and the larger the value of $\alpha$, the smaller the final queue heights and the faster the convergence. However, if $\alpha$ is too large, the methodology may become unstable.

An exact analysis can be done for the simple case of a path graph, which shows that the second-order method is stable as long as $\alpha<1+\beta$.

This method may call for flow values that are greater than the actual queue heights. Two methods to deal with this include (i) sending the maximum possible when this happens, and ignoring the rest; or (2) the excess flow called for can be remembered and sent during subsequent time steps if possible.

5.6 Alternative Implementation and Simulation Results

In a simplified, practical implementation of the methodology, the potential function may be taken to be just the square of the queue heights rather than the exponential function.

Also, instead of using a distributed protocol to search for the true lifetime, the potential function may be modified by adding a term proportional to the square of the cost of the flow, i.e.:

$$\left(\frac{a}{E_i}\sum e_{ij}^c f_{ij}^c\right)^2$$

This works very well as long as the constant $\alpha$ is chosen appropriately. With this modified potential function, choosing the flow values to minimize the potential becomes reasonably simple to do quickly and exactly.

For the simulation, the graphs were generated by randomly generating points in a square area. Performance was measured by first computing the maximum lifetime using the methodology from J. H. Chang et al., "Fast Approximation Algorithms for Maximum Lifetime Routing in Wireless Ad-hoc Networks," Lecture Notes in Computer Science: Networking 2000, vol. 1815, pp. 702-713, May 2000, running both the first- and the second-order methods for the lifetime number of rounds and noting how much flow actually reached the sink.

The simulation shows that choosing a appropriately is largely a matter of making sure that it is not too small. Larger values reduce the total flow delivered, but only slightly.

6. Extension to Local Constraints

The inventive methodology works for a wide variety of different constraints, either on the nodes or on the edges or even both.

From the proof of the core methodology given above, it follows that the methodology works for any combination of local constraints (both nodal as well as edge capacity constraints) as long as there exists a flow satisfying demands $1+\epsilon$ and meeting all the constraints. These constraints need not even be linear, as long as we are able to do the potential minimization.

6.1 Idle Power

Typically, communication is not the only energy consumer in a wireless node. The node may be doing some computation or data collection which consumes power at a rate independent of the number of packets it transmits. Also, wireless interfaces consume power even when idle and not receiving or transmitting any packets. To take these factors into account, a constant power consumption $C_i$ may be added to the node energy constraint, which becomes:

$$\sum_{j,c} e_{ij} f_{ij}^c \le \frac{E_i}{T} - C_i$$

The core methodology is not affected at all by this change. The only thing that need be verified in order to show that the lifetime maximization protocol will still work is the scaling assumption that if demands $\lambda Q_c$ can be satisfied with lifetime T, then demands $Q_c$ can be satisfied with lifetime $\lambda$T. This follows because if flow values $f_{ij}^c$ achieve demands $\lambda Q_c c$, then the flow $f_{ij}^c/\lambda$ win satisfy $Q_c$, and:

$$\sum_{j,c} e_{ij} \frac{f_{ij}^c}{\lambda} \le \frac{E_i}{\lambda T} - \frac{C_i}{\lambda} \le \frac{E_i}{\lambda T} - C_i$$

provided $\lambda \le 1$, which is true whenever this result is applied ($\lambda = 1-\delta$ in section 4).

6.2 Periodic Recharge

An interesting case is when some nodes are recharged periodically, say every $T_i$ seconds. In this case, the right hand side of the constraint for this node can be replaced with $E_i/T_i$, since the node only has to survive until its next recharge. This node does not participate in the lifetime-determining phase of the protocol, except for forwarding control packets.

6.3 Edge Constraints

Edge constraints, for example, bandwidth constraints, can be incorporated. At each node, in addition to the energy constraint:

$$\sum_{j,c} e_{ij} f_{ij}^c \le \frac{E_i}{T}$$

additional constraints:

$$f_{ij}^c \le B_{ij}$$

may be included where $B_{ij}$ is the maximum possible rate at which packets can be transmitted on link ij, perhaps due to signal-to-interference ratio (SIR) requirements.

It may also be necessary to modify the energy constraint to allow non-linear power dependences. For example, there may be an initial startup cost associated with using the transmitter or for setting up the wireless link with the node at the other end, which may be a significant fraction of the total power required. This may be implemented in accordance with the inventive methodology.

6.4 Receive Power

A transceiver consumes power when operated in receive mode as well as in transmit mode. If the network is fairly static or slowly evolving, then this can be taken into account by charging it when the packet is actually forwarded instead of when it is received. Since all but a bounded number of packets at any node will be forwarded, the energy required to receive a packet is added to the energy required to transmit it in the node constraint, which takes the form:

$$\sum_{j,c}(e_{ij}^t+e_{ij}^r)f_{ij}^c \le \frac{E_i}{T}$$

where $e_{ij}^t$ is the energy per packet for transmission, and $e_{ij}^r$ is the energy per packet for reception and decoding.

6.5 Dynamic Network

The core methodology described in section 3 works even if the network is dynamic and edge costs are varying with time, as long as it is true that there exists a multicommodity flow satisfying the demands $Q_c$.

However, because of the changing edge costs, it is possible that the lifetime may change. If any source overflow buffer hits its bound, then the current value of T is too high, and a new search can be begun using the distributed protocol with $T_h=T$ and $T_l=0$. If the current value of T is too low, this will not be detected unless the entire lifetime maximization protocol is reinitiated. This can be done after at least $R/\epsilon$ rounds have gone by, using for the starting value $T_0$ the current value of T. Waiting for this many rounds ensures that $1-\epsilon$ fraction of packets are transmitted to the appropriate destinations. So, if the rate of change in the network is slower than this, the lifetime may be tracked as the network evolves.

7. Illustrative Decision Flow at Node

Accordingly, as illustratively explained above in sections 1 through 6, the invention analogizes network traffic to fluid flow. Using such an analogy, data buffers at nodes may be thought of as fluid vessels, wherein buffer height corresponds to pressure. As is known, fluid tries to equalize heights. Thus, in the context of network traffic, the techniques of the invention make routing decisions based on local information about queue heights at neighbors.

Advantageously, at each node, queues are equalized over edges. Packets are routed from higher queues to lower queues, for each edge. Such routing is constrained by an energy budget, such that less data is routed over high-cost edges. Further, there is a trade-off between edges and connections, and such a trade-off is controlled by a potential function (see, e.g., φ discussed above).

Figure 5:
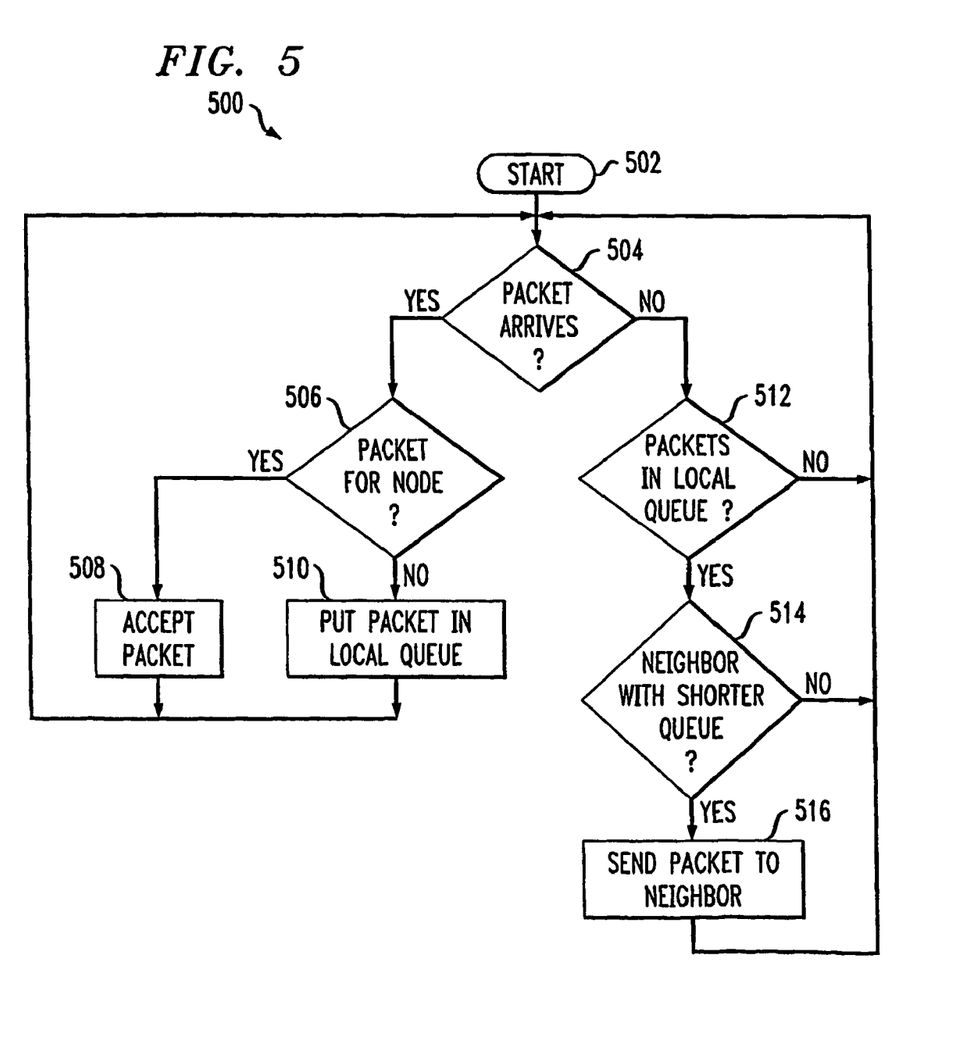
FIG. 5 is a flow diagram illustrating a decision flow at each node for a distributed routing methodology according to an embodiment of the present invention.

Referring now to FIG. 5, a flow diagram illustrates a decision flow at each node for a distributed routing methodology according to an embodiment of the invention. The decision flow 500 starts at block 502. At step 504, the node determines if a packet has arrived. If yes, the node determines, in step 506, if the packet is for it. If yes, the packet is accepted, in step 508, and the process returns to step 504. If the packet is not for the node, the packet is put in a local queue, in step 510. The process returns to step 504.

Returning to the initial determination in step 504, if no packet arrives, the node determines whether there are any packets in its local queue, in step 512. If no, the process returns to step 504. If yes, in step 514, the node determines if there is a neighboring node that has a shorter queue. If no, the process returns to step 504. If yes, the packet is sent to the neighbor, in step 516.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for routing packets in a distributed network including a plurality of nodes, the nodes being coupled via links and the nodes having queues associated with the links, the method comprising the steps of:

injecting a packet flow into the distributed network at a corresponding source node, wherein the packet flow is stored in an overflow buffer of the source node in response to a height of at least a given queue of the source node exceeding a threshold;

equalizing the queues at each node of the distributed network wherein an integer number of packets in each queue is maintained;

pushing the packet flow in the distributed network such that packets are moved from a queue with a higher height to a queue with a lower height in a manner that substantially minimizes power dissipation at affected nodes in order to prevent exhaustion of any energy reserve associated with an affected node; and absorbing the packet flow at a corresponding sink node such that heights of queues at the sink node are set to zero;

wherein each queue has a potential function associated therewith, the potential function of a given queue being a function of the height of the given queue, and wherein packets are routed so as to minimize the sum of the potential functions of the queues of the nodes of the distributed network wherein the potential function comprises a constraint based at least in part on respective energy reserves associated with affected nodes and an amount of energy required to move packets between the affected nodes.

2. The method of claim 1, wherein the distributed network is a mobile ad-hoc network, and further wherein a node and at least one neighboring node communicate over a wireless link.

3. The method of claim 1, further comprising the step of a node receiving broadcast information from at least one neighboring node pertaining to the height of at least one queue of the at least one neighboring node.

4. The method of claim 1, wherein the injecting, equalizing, pushing and absorbing steps are performed for a number of rounds such that throughput requirements are substantially satisfied while substantially maximizing a time period prior to exhaustion of an energy reserve associated with any node of the distributed network.

5. The method of claim 4, wherein the time period has an upper bound and a lower bound associated therewith.

6. The method of claim 1, further comprising the step of a node broadcasting information to at least one neighboring node pertaining to the height of at least one queue of the broadcasting node.

7. The method of claim 1, wherein the pushing step further comprises accounting for at least one of: (i) idle power consumption associated with a node; (ii) computation power consumption associated with a node; (iii) a periodic recharge associated with a node; (iv) one or more edge constraints; and (v) power consumption associated with receiving a packet at a node.

8. The method of claim 1, wherein the distributed network changes one of statically and dynamically.

9. Apparatus for use in a node of a distributed network, the distributed network including a plurality of nodes, the nodes being coupled via links and the nodes having queues associated with the links, the apparatus comprising:

a memory; and at least one processor coupled to the memory and operative to perform the steps of:

injecting a packet flow into the distributed network at a corresponding source node, wherein the packet flow is stored in an overflow buffer of the source node in response to a height of at least a given queue of the source node exceeding a threshold;

equalizing the queues at each node of the distributed network wherein an integer number of packets in each queue is maintained;

pushing the packet flow in the distributed network such that packets are moved from a queue with a higher height to a queue with a lower height in a manner that substantially minimizes power dissipation at affected nodes in order to prevent exhaustion of any energy reserve associated with an affected node; and absorbing the packet flow at a corresponding sink node such that heights of queues at the sink node are set to zero;

wherein each queue has a potential function associated therewith, the potential function of a given queue being a function of the height of the given queue, and wherein packets are routed so as to minimize the sum of the potential functions of the queues of the nodes of the distributed network wherein the potential function comprises a constraint based at least in part on respective energy reserves associated with affected nodes and an amount of energy required to move packets between the affected nodes.

10. The apparatus of claim 9, wherein the distributed network is a mobile ad-hoc network, and further wherein a node and at least one neighboring node communicate over a wireless link.

11. The apparatus of claim 9, wherein the processor is further operative to perform the step of receiving broadcast information from at least one neighboring node pertaining to the height of at least one queue of the at least one neighboring node.

12. The apparatus of claim 9, wherein the processor is further operative to perform the injecting, equalizing, pushing and absorbing steps for a number of rounds such that throughput requirements are substantially satisfied while substantially maximizing a time period prior to exhaustion of an energy reserve associated with any node of the distributed network.

13. The apparatus of claim 12, wherein the time period has an upper bound and a lower bound associated therewith.

14. The apparatus of claim 9, wherein the processor is further operative to perform the step of broadcasting information to at least one neighboring node pertaining to the height of at least one queue of the broadcasting node.

15. The apparatus of claim 9, wherein the pushing step further comprises accounting for at least one of: (i) idle power consumption associated with a node; (ii) computation power consumption associated with a node; (iii) a periodic recharge associated with a node; (iv) one or more edge constraints; and (v) power consumption associated with receiving a packet at a node.

16. The apparatus of claim 9, wherein the distributed network changes one of statically and dynamically.

17. A non-transitory, tangible computer readable medium for use in a node of a distributed network for use in a node of a distributed network, the distributed network including a plurality of nodes, the nodes being coupled via links and the nodes having queues associated with the links, the non-transitory, tangible computer readable medium containing one or more programs which when executed by a processor implement the steps of:

injecting a packet flow into the distributed network at a corresponding source node, wherein the packet flow is stored in an overflow buffer of the source node in response to a height of at least a given queue of the source node exceeding a threshold;

equalizing the queues at each node of the distributed network wherein an integer number of packets in each queue is maintained;

pushing the packet flow in the distributed network such that packets are moved from a queue with a higher height to a queue with a lower height in a manner that substantially minimizes power dissipation at affected nodes in order to prevent exhaustion of any energy reserve associated with an affected node; and absorbing the packet flow at a corresponding sink node such that heights of queues at the sink node are set to zero;

wherein each queue has a potential function associated therewith, the potential function of a given queue being a function of the height of the given queue, and wherein packets are routed so as to minimize the sum of the potential functions of the queues of the nodes of the distributed network wherein the potential function comprises a constraint based at least in part on respective energy reserves associated with affected nodes and an amount of energy required to move packets between the affected nodes.

18. The article of claim 17, wherein the distributed network is a mobile ad-hoc network, and further wherein a node and at least one neighboring node communicate over a wireless link.

19. The article of claim 17, wherein the one or more programs further implement the step of receiving broadcast information from at least one neighboring node pertaining to the height of at least one queue of the at least one neighboring node.

20. The article of claim 17, wherein the one or more programs further implement the injecting, equalizing, pushing and absorbing steps for a number of rounds such that throughput requirements are substantially satisfied while substantially maximizing a time period prior to exhaustion of an energy reserve associated with any node of the distributed network.

21. The article of claim 20, wherein the time period has an upper bound and a lower bound associated therewith.

22. The article of claim 17, wherein the processor is further operative to perform the step of broadcasting information to at least one neighboring node pertaining to the height of at least one queue of the broadcasting node.

23. The article of claim 17, wherein the pushing step further comprises accounting for at least one of: (i) idle power consumption associated with a node; (ii) computation power consumption associated with a node; (iii) a periodic recharge associated with a node; (iv) one or more edge constraints; and (v) power consumption associated with receiving a packet at a node.

24. The article of claim 17, wherein the distributed network changes one of statically and dynamically.

* * * * *